G. KOLLENBORN.
NON-REFILLABLE BOTTLE.
APPLICATION FILED JULY 27, 1910.
982,969.
Patented Jan. 31, 1911.
2 SHEETS—SHEET 1.
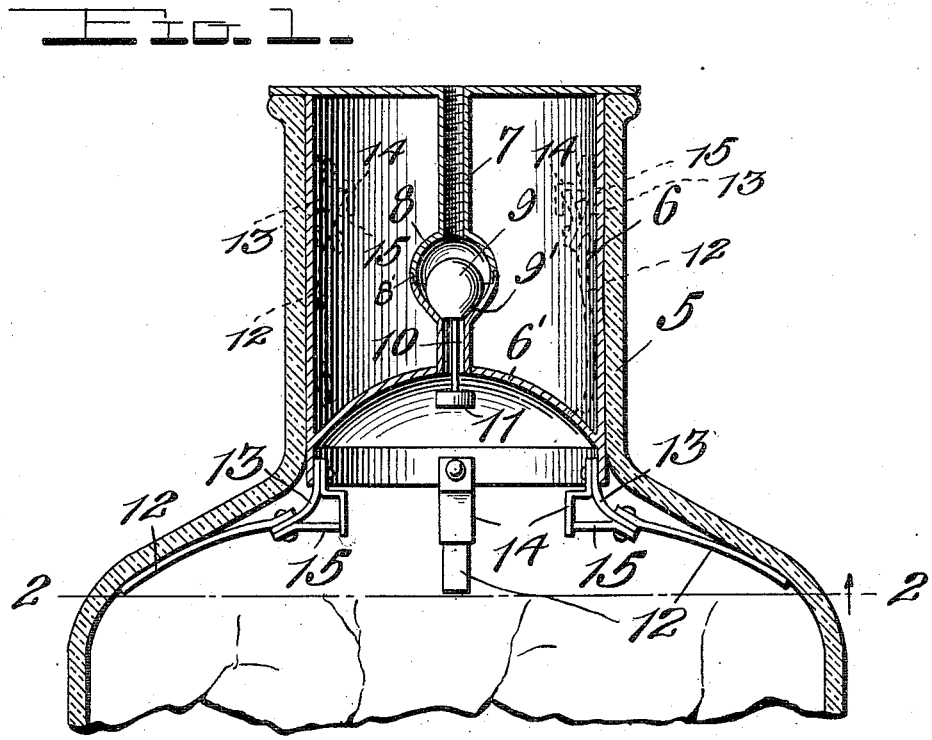
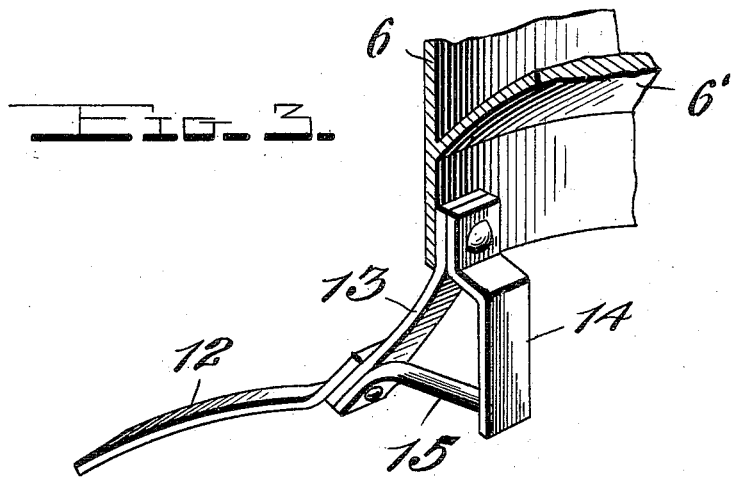
Inventor
G. Kollenborn,
By Watson E. Coleman.
Attorney
Witnesses

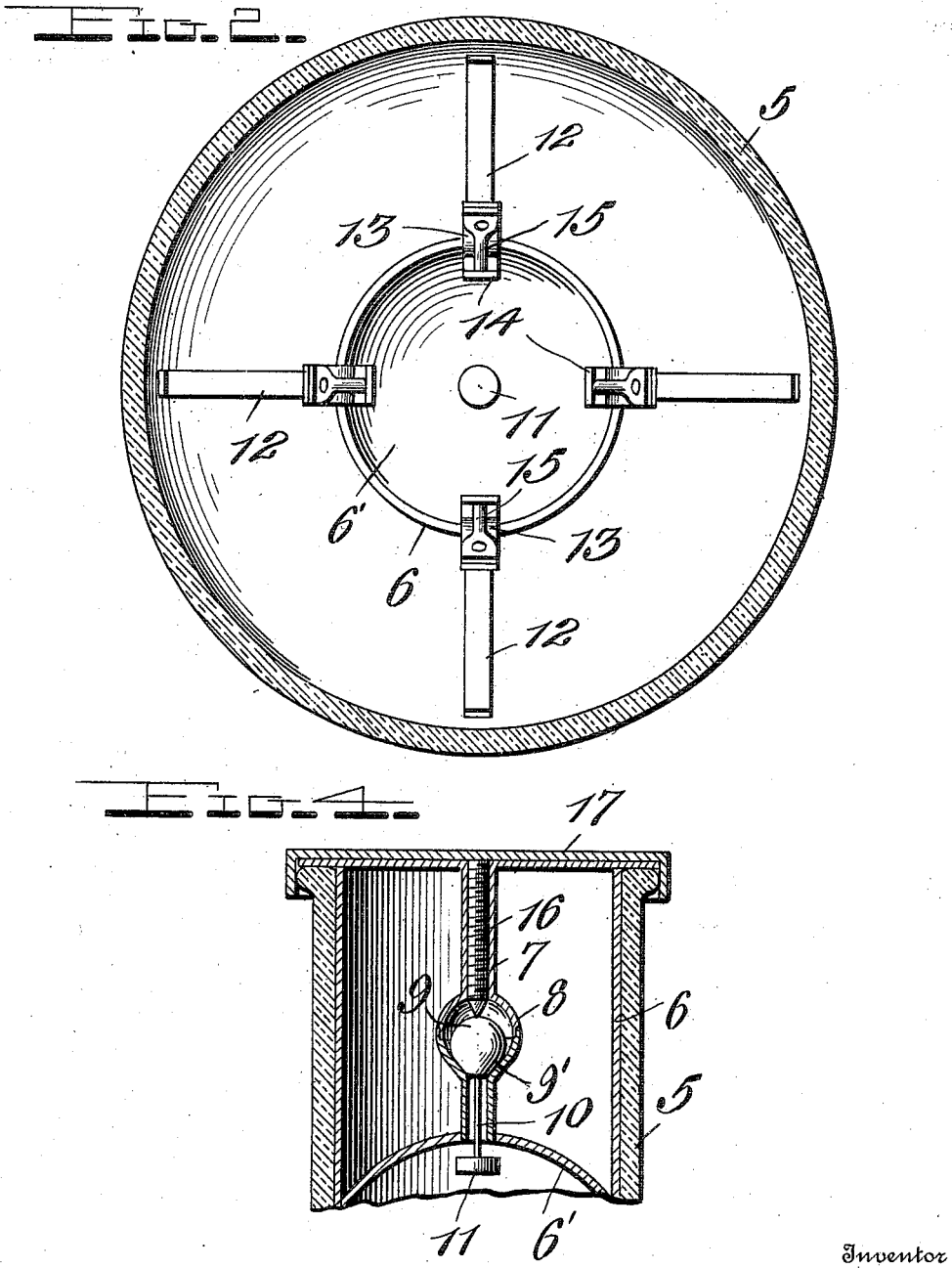

UNITED STATES PATENT OFFICE.

GEORGE KOLLENBORN, OF ELSMORE, KANSAS.

NON-REFILLABLE BOTTLE.

982,969. Specification of Letters Patent. Patented Jan. 31, 1911.

Application filed July 27, 1910. Serial No. 574,115.

*To all whom it may concern:*

Be it known that I, GEORGE KOLLENBORN, a citizen of the United States, residing at Elsmore, in the county of Allen and State of Kansas, have invented certain new and useful Improvements in Non-Refillable Bottles, of which the following is a specification, reference being had to the accompanying drawings.

This invention relates to improvements in non-refillable bottle and has for its object to provide an extremely simple and efficient device which is adapted for insertion into the neck of a bottle, suitable means being provided to prevent its withdrawal, said device effectually serving to prevent the refilling of the bottle after it has once been emptied.

Another object of my invention resides in the provision of novel non-refilling mechanism which is adapted to be arranged in the ordinary bottles such as are in universal use, and means for permitting the easy insertion of said mechanism and securely locking the same therein after it has been properly positioned in the bottle neck.

With these and other objects in view, the invention consists of the novel features of construction, combination and arrangement of parts hereinafter fully described and claimed, and illustrated in the accompanying drawings, in which—

Figure 1 is a vertical longitudinal section through the neck of a bottle, showing my improved non-refilling mechanism arranged therein; Fig. 2 is a section taken on the line 2—2 of Fig. 1; Fig. 3 is an enlarged detail perspective view of one of the locking arms, a fragment of the valve casing being shown in section; and Fig. 4 is a section similar to Fig. 1 showing the closure cap and pin in position on the bottle.

Referring more particularly to the drawings 5 indicates the bottle, in the neck of which my improved non-refilling mechanism is adapted to be inserted. This mechanism comprises a cylindrical valve casing 6 which is provided with a substantially semi-circular concavo-convex bottom plate 6'. The upper end of this valve casing is closed and is formed with an annular flange for engagement on the circumscribing edge of the upper end of the bottle neck, as clearly shown in Fig. 1. This casing is centrally formed with a tubular stem 7 and adjacent to the bottom plate 6' this stem is formed with a spherical enlargement 8. The valve casing 6 is formed in two sections, the upper section comprising the top of said casing, the upper half of the spherical enlargement 8 and the upper portion of the stem 7 which connects said enlargement and the top of the casing. The casing sections are rigidly connected as shown at 8' by threading the portion of the enlargement 8 carried by the upper section into the lower half of said enlargement which is formed upon the lower portion of the stem 7 which is fixed to or may be integrally formed with the bottom plate 6' of the casing. The point at which this enlargement joins the lower portion of the stem 7 provides a valve seat which receives a neck 9' formed on the ball valve 9. A flexible wire 10 is secured at one end to the valve 9 and extends through the lower portion of the stem 7. Upon the lower end of this wire a second valve 11 is secured which is normally disposed below the lower open end of the stem and is adapted when the bottle is inverted to seat itself over the lower open end of the stem 7 and close the same. The valve 9 is preferably formed of rubber and is hollow so that it will be readily floated into its seat when it is attempted to force a liquid through the stem 7 into the bottle by inverting the same. The valve 11 on the lower end of the wire 10 draws the valve 9 to its seat when the bottle is disposed in its normal upright position.

To the lower outer edge of the semi-circular valve casing 6, and at diametrically opposite points a plurality of arms 12 are secured and extend outwardly and radially therefrom. These arms are connected to the lower end of the cylindrical tubular casing 6' by means of the heavy leaf springs 13 which normally hold the same outwardly as shown in Fig. 1. A second leaf spring 14, of angular form is also secured to the lower end of the cylindrical casing 6' and extends inwardly in an opposite direction to the arms 12. Each of the arms 12 carries a locking pin 15 which is adapted when the device is positioned in the bottle neck to engage behind the lower ends of the spring members 14 and prevent the inward movement of the arms 12 when it is attempted to withdraw the non-refilling mechanism from the bottle. The arms 12 engage closely upon the inner surface of the body of the bottle when the device is in operative position. In order to insert the mechanism into the neck of the bottle, the arms 12 are forced inwardly into the position indicated in dotted lines in Fig. 1 the pins 15 carried by said arms forcing the spring members inwardly and upwardly. After the device has been inserted so that the arms 12 extend below the bottle neck, the heavy springs 13 throw the arms outwardly and engage the same with the body of the bottle.

The upper portion of the stem 7 above the enlargement 8 thereof is interiorly threaded to receive an exteriorly threaded rod 16 centrally formed on a cap 17. The lower end of this rod is tapered to engage upon the valve ball 9 and hold the same in its seat in the shipment of the device. This rod also prevents the entrance of dust, dirt or other foreign matter into the stem 7 and may be very quickly arranged therein after each use of the bottle.

From the foregoing it is believed that the construction and operation of my improved non-refilling device for bottles will be readily understood. It is of extremely simple construction and may be easily and quickly arranged in the bottle neck. Moreover, it will be observed that it is capable of use with bottles of conventional form, and requires no alterations whatever in their construction. By providing my improved locking means it is absolutely impossible to remove the mechanism from the bottle neck after it has once been inserted therein and liquid cannot be injected into the bottle through the stem 7 as upon such attempt the float ball 9 would be forced into its seat and close the lower portion of said stem. It will thus be seen that the only way in which the bottle can again be used for commercial purposes after it is once emptied is to break the bottle neck. The cylindrical casing 6 and the bottom plate 6' together with the stem 7 are preferably constructed of aluminum or other sheet metal. In order to discharge the contents of the bottle, it is simply necessary to horizontally position the bottle so as to dispose the valve member 11 to one side of the entrance to the stem 7, the flexible wire 10 being sufficiently long to allow the float ball 9 to be unseated as the fluid strikes the same in its movement through the same. When the bottle is horizontally positioned the movement of the weight 11 to one side of the entrance to the tubular stem 7 will permit the liquid to flow into said stem, the force of which unseats the valve 9. It will be understood that the flexible connection 10 between the members 9 and 11 is sufficiently long to permit of the movement of the float ball 9 without drawing the member 11 over the open end of the stem 7, thus allowing a continuous flow of the liquid through said stem. The interior area of the enlargement 8 is also amply sufficient to allow the fluid to move around the float ball and out through the upper portion of said stem.

While I have shown and described the preferred construction and arrangement of the various parts, it will be understood that the device is susceptible of many minor modifications without departing from the essential feature or sacrificing any of the advantages thereof.

Having thus described the invention what is claimed is:—

1. In a device of the character described, the combination with a valve adapted to be arranged in a bottle neck, of a plurality of radial arms secured to the lower end of the valve casing at diametrically opposite points, leaf springs connecting said arms and the valve casing to normally force said arms outwardly into yielding engagement with the body of the bottle, depending spring plates secured to the lower end of the valve casing, and locking means carried by said arms adapted to engage said plates and prevent the inward movement of the arms and the withdrawal of the valve from the bottle neck.

2. In a device of the character described, the combination with a valve adapted to be arranged in a bottle neck, of a plurality of radial arms secured to the valve casing at diametrically opposite points, leaf springs normally acting to force the arms outwardly into engagement with the body of the bottle, depending spring plates secured to the valve casing, and locking elements carried by the arms movable beneath said spring plates as the arms move outwardly into engagement with the bottle, said locking elements engaging said spring plates in the operative positions of the arms to prevent the withdrawal of the valve from the bottle neck.

3. In a device of the character described, the combination with a valve adapted to be arranged in a bottle neck, of a plurality of spring controlled arms secured to the lower end of the valve casing at diametrically opposite points, spring plates depending from said valve casing, said arms being engaged with the inner wall of the body of the bottle in their operative positions, and a locking pin carried by said arms movable beneath said spring plates as the arms assume their operative positions and engageable with the outer faces of said spring plates to lock the arms in their operative positions against inward movement and prevent the withdrawal of the valve from the bottle neck.

In testimony whereof I hereunto affix my signature in the presence of two witnesses.

GEORGE KOLLENBORN.

Witnesses:
 MELL PENNINGTON,
 CHAS. E. PENNINGTON.